(12) United States Patent
Hasumi

(10) Patent No.: US 12,437,061 B2
(45) Date of Patent: Oct. 7, 2025

(54) LOG GENERATION APPARATUS, ABNORMALITY DETECTION SYSTEM, LOG GENERATION METHOD, AND NON-TRANSITORY COMPUTER READABLE MEDIUM

(71) Applicant: NEC Corporation, Tokyo (JP)

(72) Inventor: Daichi Hasumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 18/574,401

(22) PCT Filed: Jul. 2, 2021

(86) PCT No.: PCT/JP2021/025188
§ 371 (c)(1),
(2) Date: Dec. 27, 2023

(87) PCT Pub. No.: WO2023/276154
PCT Pub. Date: Jan. 5, 2023

(65) Prior Publication Data
US 2024/0338436 A1    Oct. 10, 2024

(51) Int. Cl.
*G06F 21/00*    (2013.01)
*G06F 21/55*    (2013.01)

(52) U.S. Cl.
CPC .................. *G06F 21/552* (2013.01)

(58) Field of Classification Search
CPC .............. G06F 21/552; G06F 21/55
See application file for complete search history.

(56) References Cited

U.S. PATENT DOCUMENTS

2016/0357960 A1\* 12/2016 Katoh .................. H04L 63/0245
2017/0228460 A1\* 8/2017 Amel ..................... G06F 16/248
(Continued)

FOREIGN PATENT DOCUMENTS

JP    2001-356939 A    12/2001
JP    2010-182194 A    8/2010
(Continued)

OTHER PUBLICATIONS

Japanese Office Communication for JP Application No. 2023-531330 mailed on Nov. 19, 2024 with English Translation.
(Continued)

*Primary Examiner* — William A Corum, Jr.

(57) ABSTRACT

A log generation apparatus includes an input operation log collection unit that collects input operation logs in which an operation event of an input device is recorded; an information log collection unit that collects information logs in which a process event related to processing performed by an information apparatus connected to the input device is recorded, the information logs being different from the input operation logs; and a generation unit that generates, based on the information logs and the input operation logs, a user operation log including identification information of an application, the application being one which is inferred from the input operation logs and for which the processing is performed, and generates, as a log group for detecting an abnormality, a user operation log group including the user operation logs arranged in an order according to times of occurrences of operation events or process events.

11 Claims, 19 Drawing Sheets

(56) References Cited

U.S. PATENT DOCUMENTS

2017/0364561 A1    12/2017   Wu et al.
2022/0012345 A1*   1/2022   Isoyama ................. G06F 11/30
2023/0032678 A1*   2/2023   Marwah ................. G06F 21/54

FOREIGN PATENT DOCUMENTS

WO     2013/105128 A1    7/2013
WO     2015/186155 A1    12/2015

OTHER PUBLICATIONS

International Search Report for PCT Application No. PCT/JP2021/025188, mailed on Sep. 14, 2021.

* cited by examiner

```
{
  "event_type": "MouseLeftClick",
  "time": "2021/03/12 11:31:21",
  "window_name": "Browser1",
  "gui_path": "Desktop 1/Browser Window/Tab Pane/Tab Bar/New Tab Item/Close Tab Button",
  "coordinate": {
    "x": 8,
    "y": 9
  }
},
{
  "event_type": "KeyboardInput",
  "time": "2021/03/12 11:31:30",
  "window_name": "Browser1",
  "input": "[Enter Key]"
},
{
  "event_type": "MouseLeftClick",
  "time": "2021/03/12 11:31:55",
  "window_name": "Browser1",
  "gui_path": "Desktop 1/Browser Window/Browser View",
  "coordinate": {
    "x": 768,
    "y": 489
  }
},
...
{
  "event_type": "MouseLeftClick",
  "time": "2021/03/12 13:09:41",
  "window_name": "Text Editor1",
  "gui_path": "Desktop 1/Save As Window/Save Button",
  "coordinate": {
    "x": 8,
    "y": 9
  }
},
...
```

Fig. 5

| Event Type | Time | Window Name | GUI Path | Values |
|---|---|---|---|---|
| ... | ... | ... | ... | ... |
| Mouse LeftClick | 2021/03/12 11:31:21 | Browser1 | Desktop 1/Browser Window/Tab Pane/ Tab Bar/New Tab Item/Close Tab Button | "coordinate": {"x": 8, "y": 9} — 400 |
| KeyboardInput | 2021/03/12 11:31:30 | Browser1 | null | "input": "[Enter Key]" — 401 |
| Mouse LeftClick | 2021/03/12 11:31:55 | Browser1 | Desktop 1/Browser Window/Browser View | "coordinate": {"x": 768, "y": 489} — 402 |
| ... | ... | ... | ... | ... |

Fig. 6

```
...,
{
  "name": "url_access_events",
  "time": "2021/03/10 19:06:01",
  "url": "https://example.local/foo",
},
{
  "name": "url_access_events",
  "time": "2021/03/11 16:10:12",
  "url": "https://bar.local/foo",
},
{
  "name": "url_access_events",
  "time": "2021/03/12 11:31:30",
  "url": "https://example.local",
},
{
  "name": "url_access_events",
  "time": "2021/03/12 11:31:55",
  "url": "https://example.local/test",
},
...
```

Fig. 7

```
...,
{
   "name": "ntfs_events",
   "time": "2021/03/12 10:15:28",
   "action": "FileTruncation",
   "drive_letter": "C",
   "file_attributes": "FILE_ATTRIBUTE_ARCHIVE",
   "old_path": "",
   "partial": "0",
   "path": "C:¥¥Users¥¥User¥¥Documents¥¥test.txt"
},
{
   "name": "ntfs_events",
   "time": "2021/03/12 13:09:41",
   "action": "FileTruncation",
   "drive_letter": "C",
   "file_attributes": "FILE_ATTRIBUTE_ARCHIVE",
   "old_path": "",
   "partial": "0",
   "path": "C:¥¥Users¥¥User¥¥Documents¥¥example.docx"
},
...
```

Fig. 9

| Event Type | Time | Action | Path | Old Path |
|---|---|---|---|---|
| ... | ... | ... | ... | ... |
| ntfs_events | 2021/03/12 10:15:28 | FileTruncation | C:\\Users\\User\\Documents\\test.txt | null |
| ntfs_events | 2021/03/12 13:09:41 | FileTruncation | C:\\Users\\User\\Documents\\example.docx | null |
| ... | ... | ... | ... | ... |

Fig. 10

| Machine ID | Time | Application ID | Operation | Target |
|---|---|---|---|---|
| ... | ... | ... | ... | ... |
| 0001 | 2021/03/12 11:31:21 | Browser1 | close tab | null |
| 0001 | 2021/03/12 11:31:30 | Browser1 | open url | https://example.local |
| 0001 | 2021/03/12 11:31:55 | Browser1 | open url | https://example.local/test |
| 0001 | 2021/03/12 13:09:41 | Text Editor1 | open | C:¥¥Users¥¥User¥¥Documents¥¥example.docx |
| ... | ... | ... | ... | ... |

| INFORMATION APPARATUS ID | 0001 |
|---|---|
| COMPARISON PERIOD | A:(2021/03/11 0:00 - 2021/03/11 23:59:59) |
| | B:(2021/03/12 0:00 - 2021/03/12 23:59:59) |
| WINDOW PERIOD | 1 Hour |
| THRESHOLD VALUE | 0.3 |

Fig. 14

LOG GENERATION APPARATUS, ABNORMALITY DETECTION SYSTEM, LOG GENERATION METHOD, AND NON-TRANSITORY COMPUTER READABLE MEDIUM

This application is a National Stage Entry of PCT/JP2021/025188 filed on Jul. 2, 2021, the contents of all of which are incorporated herein by reference, in their entirety.

TECHNICAL FIELD

The present disclosure relates to a log generation apparatus, an abnormality detection system, a log generation method, and a non-transitory computer readable medium.

BACKGROUND ART

In recent years, damages caused by cyber-attacks targeting organizations, such as information leakages and suspensions of businesses, are increasing, and it has thus been desired to strengthen countermeasures against such cyber-attacks. Note that it is expected that cyber-attackers' intentions in doing operations are different from those of legitimate users. Therefore, it has been proposed to collect logs of an information apparatus as a trace that reflects an intention in doing operations, and to detect an abnormality by using these logs of the information apparatus.

For example, Patent Literature 1 discloses a log analysis apparatus that compares a frequency distribution of time intervals between logs of a physical facility management apparatus and logs of an information apparatus that performs information processing in response to a user's operation in the past with a frequency distribution of the same in the present time, and thereby detects an abnormality in the information apparatus. Patent Literature 1 describes that access logs of a file server can be used as logs of the information apparatus.

CITATION LIST

Patent Literature

Patent Literature 1: International Patent Publication No. WO2015/186155

SUMMARY OF INVENTION

Technical Problem

It should be noted that when a user of an information apparatus is using a plurality of applications in a series of operations, it is necessary to, in order to detect an abnormality, take a user's intention in doing the series of operations into consideration. However, in the above-described method disclosed in Patent Literature 1, since the access logs of the file server are merely used as the logs of the information apparatus, there is a problem that a user's intention in doing the series of operations is not sufficiently taken into consideration.

In view of the above-described problem, an object of the present disclosure is to provide a log generation apparatus, an abnormality detection system, a log generation method, and a non-transitory computer readable medium capable of generating logs that reflect an intention in doing a series of operations by a user who uses an information apparatus.

Solution to Problem

A log generation apparatus according to an aspect of the present disclosure includes input operation log collection means, information log collection means, and generation means. The input operation log collection means collects input operation logs in which an operation event of an input device is recorded. The information log collection means collects information logs in which a process event related to processing performed by an information apparatus connected to the input device is recorded, the information logs being different from the input operation logs. The generation means generates, based on the information logs and the input operation logs, a user operation log including identification information of an application, the application being one which is inferred from the input operation logs and for which the processing is performed. Then, the generation means generates, as a log group for detecting an abnormality, a user operation log group including the user operation logs arranged in an order according to times of occurrences of operation events or process events.

An abnormality detection system according to an aspect of the present disclosure includes the above-described log generation apparatus, and an abnormality detection apparatus configured to detect an abnormality by using the user operation log group.

A log generation method according to an aspect of the present disclosure includes: collecting input operation logs in which an operation event of an input device is recorded; collecting information logs in which a process event related to processing performed by an information apparatus connected to the input device is recorded, the information logs being different from the input operation logs; generating, based on the information logs and the input operation logs, a user operation log including identification information of an application, the application being one which is inferred from the input operation logs and for which the processing is performed; and generating, as a log group for detecting an abnormality, a user operation log group including the user operation logs arranged in an order according to times of occurrences of operation events or process events.

A non-transitory computer readable medium according to an aspect of the present disclosure stores a program for causing a computer to perform: an input operation log collection process for collecting input operation logs in which an operation event of an input device is recorded; an information log collection process for collecting information logs in which a process event related to processing performed by an information apparatus connected to the input device is recorded, the information logs being different from the input operation logs; and a generation process for generating, based on the information logs and the input operation logs, a user operation log including identification information of an application, and generating, as a log group for detecting an abnormality, a user operation log group including the user operation logs arranged in an order according to times of occurrences of operation events or process events, the application being one which is inferred from the input operation logs and for which the processing is performed.

Advantageous Effects of Invention

According to the present disclosure, it is possible to provide a log generation apparatus, an abnormality detection system, a log generation method, and a non-transitory computer readable medium capable of generating logs that reflect an intention in doing a series of operations by a user who uses an information apparatus.

BRIEF DESCRIPTION OF DRAWINGS

FIG. 5 is a diagram illustrating an example of a data structure of an unprocessed input operation log according to the second example embodiment.

FIG. 6 is a diagram illustrating an example of a data structure of a processed input operation log according to the second example embodiment.

FIG. 7 is a diagram illustrating an example of a data structure of an unprocessed web access log according to the second example embodiment.

FIG. 9 is a diagram illustrating an example of a data structure of an unprocessed file access log according to the second example embodiment.

FIG. 10 is a diagram illustrating an example of a data structure of a processed file access log according to the second example embodiment.

FIG. 12 is a diagram illustrating an example of a data structure of a user operation log group according to the second example embodiment.

FIG. 14 is a diagram illustrating an example of a data structure of a computational instruction according to the second example embodiment.

EXAMPLE EMBODIMENTS

Figure 1:
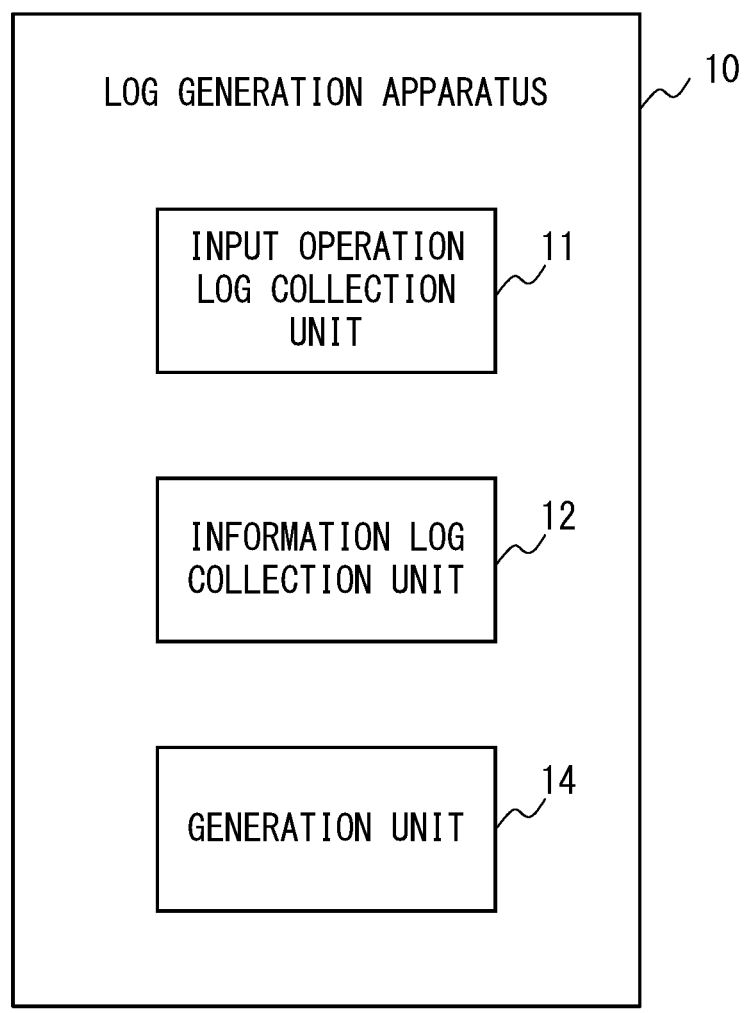
FIG. 1 is a block diagram illustrating a configuration of a log generation apparatus according to a first example embodiment.

The present disclosure will be described hereinafter through example embodiments, but the disclosure according to the claims is not limited to the below-illustrated example embodiment. Further, all the components/structures described in the example embodiments are not necessarily indispensable as means for solving the problem. Note that the same reference numerals (or symbols) are assigned to the same elements throughout the drawings and redundant descriptions thereof are omitted as appropriate.

First, an outline of example embodiments will be described. Details of operations performed by a user (hereinafter, also referred to as user operations) are mainly recorded as operation events of an input device such as a mouse and a keyboard. An operation event in the input device is considered to be a minimum unit representing an interaction between an information apparatus and a user who uses it. However, only an operation type, the time of the occurrence of an event, an application process number corresponding to the event, and the like can be acquired from the operation event in the input device. Further, the operation event in the input device includes neither information such as a file name named by the user and a directory in which the user saved the file, nor information indicating a user's intention such as information as to which URL (Uniform Resource Locator) the user moved by clicking a button on a web page. Therefore, it is difficult to find a user's intention in doing a series of operations just by keeping track of operation events in the input device. This problem particularly becomes noticeable when the user uses a plurality of applications. Therefore, in the example embodiments, by using operation events in an input device as base information and combining other types of logs of an information apparatus therewith, a group of user operation logs (hereinafter, also referred to as a user operation log group) in which the operation events in the input device are complemented by information indicating the user's intensions of doing operations is generated.

First Example Embodiment

First, a first example embodiment according to the present disclosure will be described. FIG. 1 is a block diagram illustrating a configuration of a log generation apparatus 10 according to the first example embodiment. The log generation apparatus 10 is a computer apparatus that generates a group of logs (hereinafter, also referred to as a log group) for detecting an abnormality. The log generation apparatus 10 includes an input operation log collection unit 11, an information log collection unit 12, and a generation unit 14.

The input operation log collection unit 11 is also referred to as input operation log collection means. The input operation log collection unit 11 collects input operation logs. Note that an input operation log is a log in which an operation event(s) in an input device is recorded. The input device is one that is connected to an information apparatus. An operation event in the input device occurs as a user operates the input device.

The information log collection unit 12 is also referred to as information log collection means. The information log collection unit 12 collects information logs. An information log is a log in which a process event(s) related to processing performed by the information apparatus is recorded, and is different from the input operation log. The information log collection unit 12 may collect information logs corresponding to a plurality of applications.

The generation unit 14 generates a user operation log based on the information logs and the input operation logs. The generated user operation log includes identification information (an application ID) of an application for which the aforementioned processing by the information apparatus is performed. Note that the application ID is inferred from the input operation log. For example, the generation unit 14 generates a user operation log by applying information contained in an information log in which a process event that occurred at the same time as an operation event recorded in an input operation log of the user is recorded to information contained in the input operation log. The generation unit 14 can generate, by using information logs corresponding to a plurality of applications, a log that is complemented by a user's intention in doing operations in the plurality of applications. Then, the generation unit 14 generates a user operation log group including such user operation logs in a time-series manner (i.e., in a chronological order). Note that "including in a time series manner" means including in an order according to the time of the occurrences of operation events of input operations or the above-described process events of processing.

Figure 2:
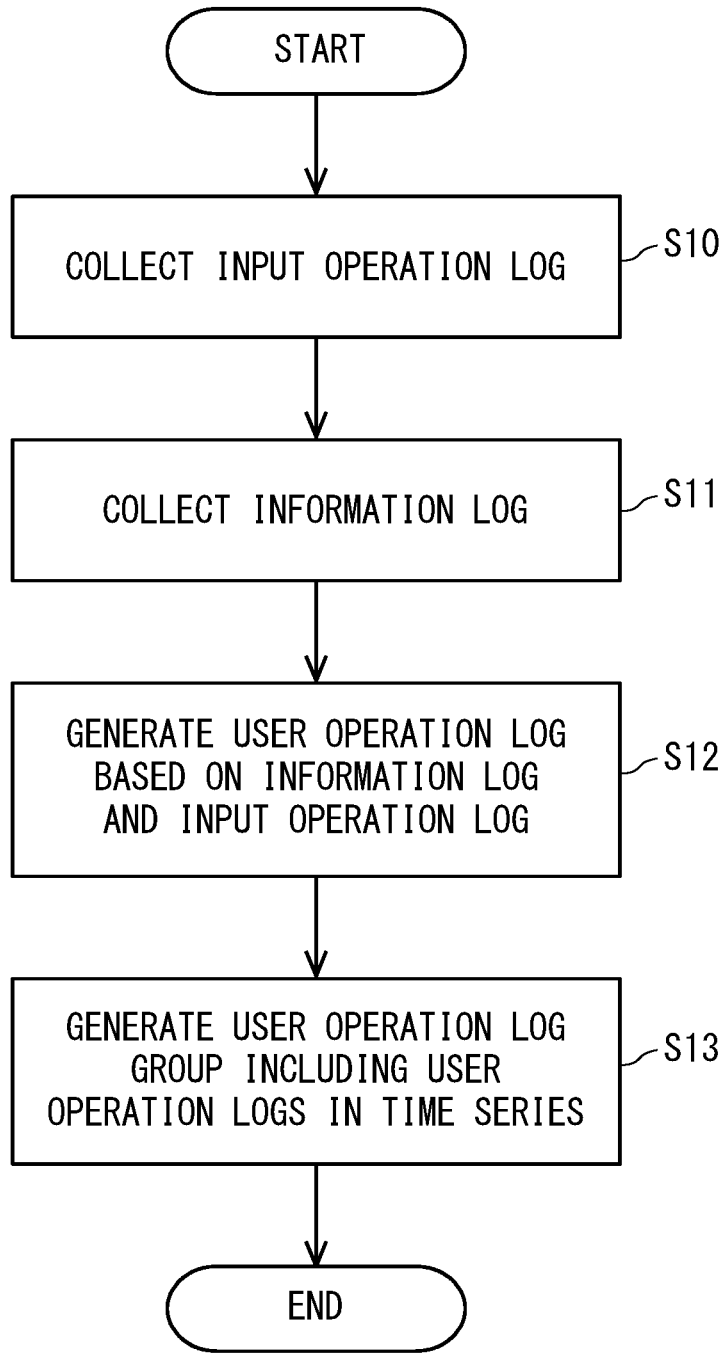
FIG. 2 is a flowchart illustrating a flow of a log generation method according to the first example embodiment.

FIG. 2 is a flowchart illustrating a flow of a log generation method according to the first example embodiment. First, the input operation log collection unit 11 of the log generation apparatus 10 collects input operation logs (S10). Next, the information log collection unit 12 collects information logs (S11). Next, the generation unit 14 generates a user operation log based on the collected information logs and the collected input operation logs (S12). In this process, the generation unit 14 includes (i.e., incorporates) an application ID(s) of an application(s) inferred from the input operation logs in the user operation log. Next, the generation unit 14 arranges (i.e., sorts) such user operation logs in a time-series manner (i.e., in a chronological order) and thereby generates a user operation log group including the user operation logs arranged in a time-series manner (S13).

As described above, according to the first example embodiment, the log generation apparatus 10 complements information contained in input operation logs by information contained in information logs, generates user operation logs each of which includes an application ID(s), and thereby generates a user operation log group as a time-series sequence. Therefore, even when a user uses a plurality of applications, it is possible to generate a log group for detecting an abnormality in which a user's intention in doing a series of operations is reflected (i.e., taken into consideration). In this way, it is possible to improve the accuracy of the detection of an abnormality.

Second Example Embodiment

Figure 3:
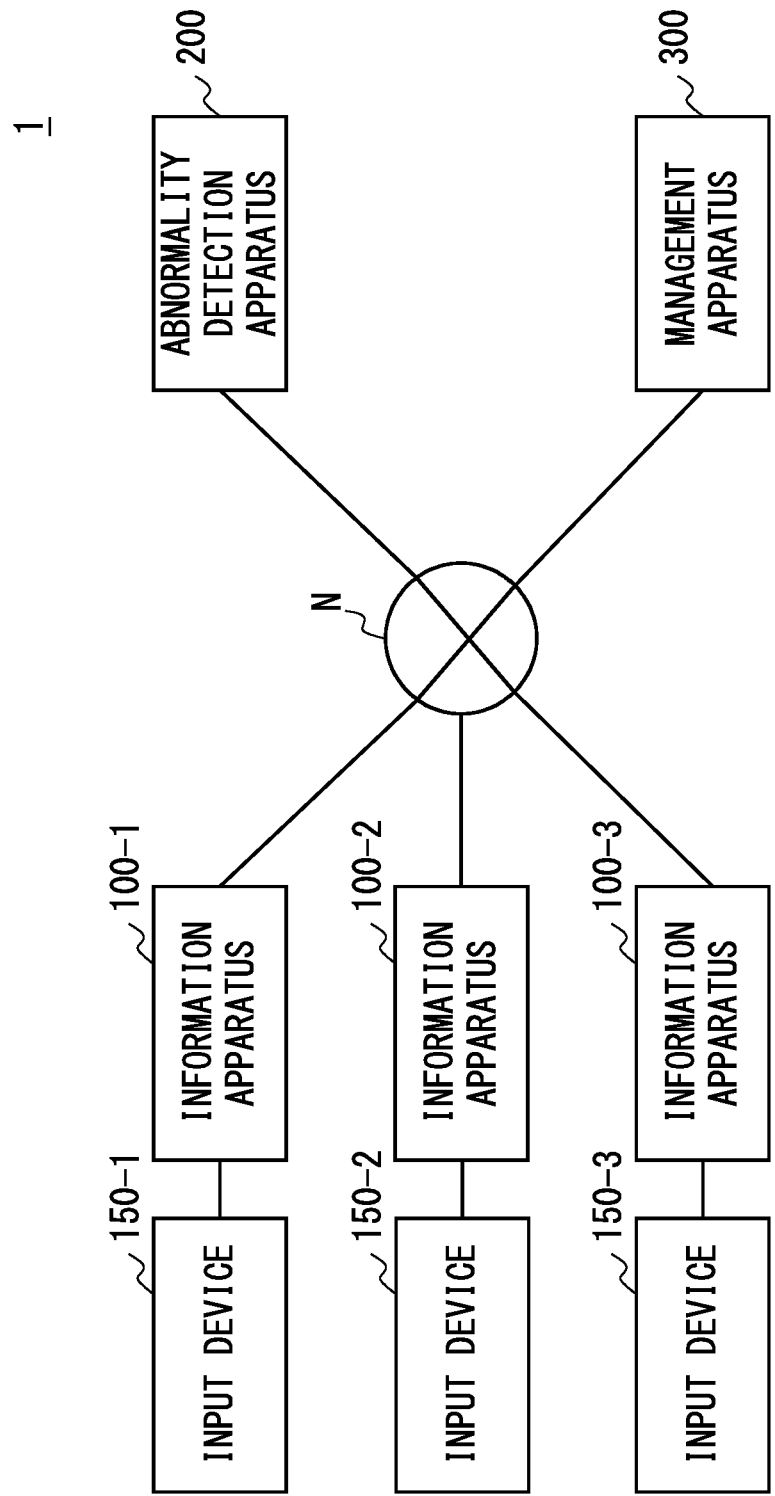
FIG. 3 is a schematic configuration diagram of an abnormality detection system according to a second example embodiment.

Next, a second example embodiment according to the present disclosure will be described. FIG. 3 is a schematic configuration diagram of an abnormality detection system 1 according to the second example embodiment. The abnormality detection system 1 is a computer system that detects whether or not an abnormality has occurred in an information apparatus to be monitored. The abnormality means, for example, a situation in which an outsider illegally operates an information apparatus of the user, a situation in which an outsider illegally invades a system of the information apparatus through an illegal operation and illegally brings out information, or a situation in which the system of the information apparatus is under a cyber-attack. The abnormality detection system 1 includes information apparatuses 100-1, 100-2 and 100-3, input devices 150-1, 150-2 and 150-3 connected to the information apparatuses 100-1, 100-2 and 100-3, respectively, an abnormality detection apparatus 200, and a management apparatus 300.

In the following description, when any of the information apparatuses 100-1, 100-2 and 100-3 is referred to, it may be referred to simply as an information apparatus 100, and when any of the input devices 150-1, 150-2 and 150-3 is referred to, it may be referred to simply as an input device 150. The number of information apparatuses 100 and the number of input devices 150 are not limited to three, and may be one or two, or greater than three.

The information apparatus 100, the abnormality detection apparatus 200, and the management apparatus 300 are connected to each other through a network N.

The information apparatus 100 is an information apparatus to be monitored. The information apparatus 100 receives an input operation performed by a user through the input device 150 and performs information processing according to the input operation. Event information of an input operation received by the information apparatus 100 is recorded in an input operation log. Further, process event information related to information processing performed in the information apparatus 100 is recorded in an information log. The information log is different from the input operation log. The information log is a log recorded by a respective application, and may be a web access log, a file access log, or the like. Further, the information log may be a system log recorded by an operating system (OS), or a log recorded by an entity other than the information apparatus, such as a proxy log or a log recorded on a SIEM (Security Information and Event Management).

The information apparatus 100 collects input operation logs and information logs, and generates, based on the collected information logs and the collected input operation logs, a user operation log group reflecting a user's intention in doing a series of operations (i.e., a user operation log in which a user's intention in doing a series of operations is taken into consideration). That is, the information apparatus 100 corresponds to the above-described log generation apparatus 10 according to the first example embodiment. The information apparatus 100 transmits the generated user operation log group to the abnormality detection apparatus 200 through the network N.

The input device 150 is, for example, a mouse, a keyboard, and/or a touch panel.

The management apparatus 300 is a computer apparatus that monitors and manages the information apparatus 100 connected to the network N. When an occurrence of a possible abnormality in the information apparatus 100 is detected by an apparatus other than the abnormality detection apparatus 200, the management apparatus 300 transmits a computational instruction to the abnormality detection apparatus 200. The computational instruction is an instruction to execute calculation for detecting an abnormality by using the user operation log group. Further, the management apparatus 300 may periodically transmit the computational instruction to the abnormality detection apparatus 200.

The abnormality detection apparatus 200 receives the user operation log group from the information apparatus 100 through network N and accumulates such user operation log groups. Then, the abnormality detection apparatus 200 detects an abnormality by using the user operation log group in response to the reception of the computational instruction from the management apparatus 300. For example, the abnormality detection apparatus 200 compares user operation log groups obtained in different periods, received from the information apparatus 100 of interest, with each other, and thereby detects an abnormality based on the result of the comparison. Then, the abnormality detection apparatus 200 transmits the result of the detection of the abnormality to the management apparatus 300. Alternatively, when an abnormality is detected, the abnormality detection apparatus 200 transmits alert information to the management apparatus 300 or to the information apparatus 100.

Figure 4:
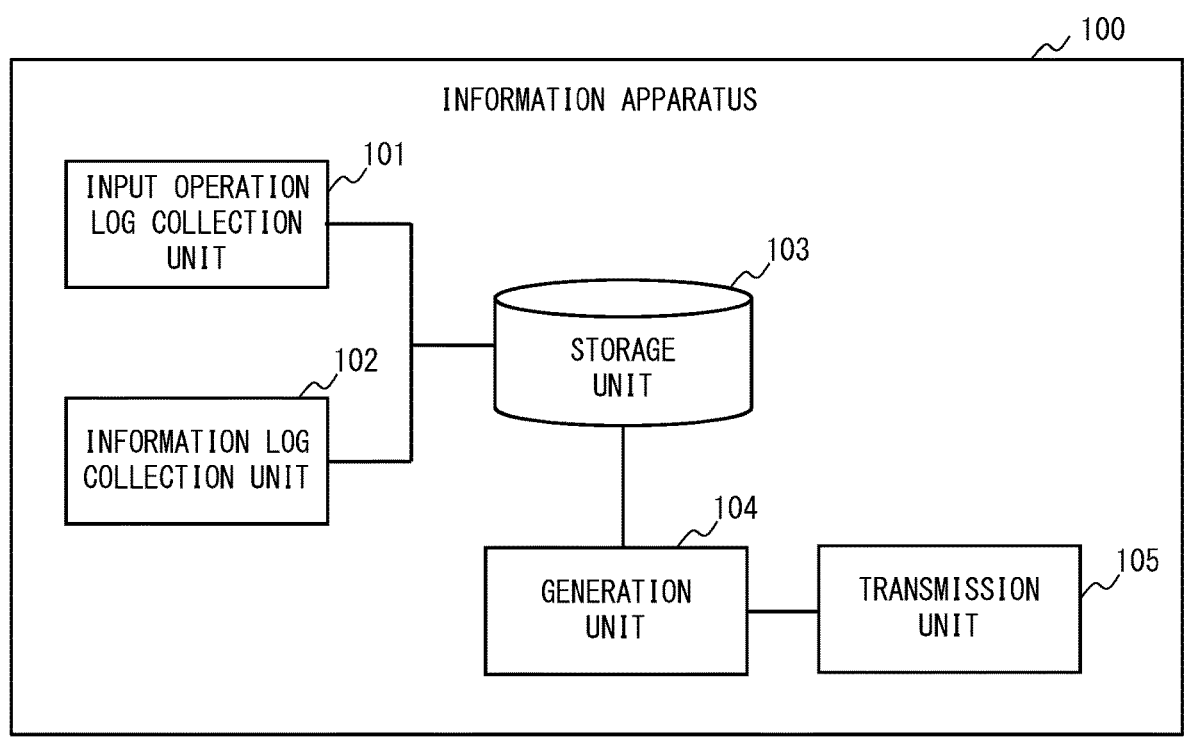
FIG. 4 is a block diagram illustrating a configuration of an information apparatus according to the second example embodiment.

FIG. 4 is a block diagram illustrating a configuration of the information apparatus 100 according to the second example embodiment. The information apparatus 100 includes an input operation log collection unit 101, an information log collection unit 102, a storage unit 103, a generation unit 104, and a transmission unit 105.

The input operation log collection unit 101 is an example of the above-described input operation log collection unit 11. The input operation log collection unit 101 collects input operation logs from a storage device (not illustrated) provided in the information apparatus 100. Note that raw input operation logs which were collected by the input operation log collection unit 101 are also referred to unprocessed input operation logs. The input operation log collection unit 101 processes unprocessed input operation logs into logs having a predetermined data structure, and stores the processed input operation logs in the storage unit 103.

The information log collection unit 102 is an example of the above-described information log collection unit 12. The information log collection unit 102 collects information logs. The information logs to be collected include information logs of which applications for which processing is performed are different from each other. For example, the information log collection unit 102 acquires an information log (a web access log, a file access log, a system log, or the like) from a storage device (not illustrated) provided in the information apparatus 100. Further, for example, the information log collection unit 102 acquires an information log (a proxy log, a SIEM log, or the like) from an external apparatus connected to the information apparatus 100. Note that information logs which were collected by the information log collection unit 102, but on which no processing or the like has been performed yet are also referred to unprocessed information logs. The information log collection unit 102 processes unprocessed information logs into logs having a predetermined data structure, and stores the processed information logs in the storage unit 103.

The storage unit 103 is also referred to as storage means. The storage unit 103 is a storage medium that stores processed input operation logs and processed information logs.

The generation unit 104 is an example of the above-described generation unit 14. The generation unit 104 generates a user operation log that is obtained by complementing information contained in processed input operation logs by information contained in processed information logs. First, the generation unit 104 acquires processed input operation logs and processed information logs stored in the storage unit 103. For each of the processed input operation logs, the generation unit 104 specifies, from the input operation log, an application ID of an application for which an input operation is performed. Then, the generation unit 104 generates input operation information. The input operation information includes at least an application ID and the time of the occurrence of an operation event. Further, the input operation information may further include at least one of information indicating the type of the input operation (an operation type) or information about a target of the input operation (i.e., an entity, an object, or the like on which the input operation is performed).

Then, the generation unit 104 determines whether or not there is a processed information log corresponding to the processed input operation log. The presence of a processed information log corresponding to the processed input operation log means the presence of a processed information log in which a process event that occurred at the same time as the occurrence of the operation event recorded in the processed input operation log is recorded. When there is a processed information log corresponding to the processed input operation log, the generation unit 104 generates one or more user operation logs based on information contained in this processed information log and the input operation information. Specifically, the generation unit 104 generates a user operation log(s) by adding the input operation information to the information contained in the processed information log or unifying (or combining) the information contained in the processed information log with the input operation information. Note that when there is no processed information log corresponding to the processed input operation log, the generation unit 104 generates a user operation log based solely on the input operation information. Specifically, the generation unit 104 generates (i.e., uses) the input operation information as a user operation log.

Then, the generation unit 104 generates, as a user operation log group, a sequence in which a plurality of user operation logs is arranged (i.e., sorted) in an order according to times of occurrences of operation events or process events. The generation unit 104 supplies the generated user operation log group to the transmission unit 105.

The transmission unit 105 is also referred to as transmission means. The transmission unit 105 transmits the user operation log group to the abnormality detection apparatus 200 through the network N.

FIG. 5 is a diagram illustrating an example of a data structure of an unprocessed input operation log according to the second example embodiment. The unprocessed input operation log includes a type of an operation event (event_type), the time of the occurrence of the operation event (time), an application ID of an application for which an input operation was performed (window_name), and the target of the input operation. The target of the input operation includes, for example, path information "gui_path" of an item to be selected in case of a selection operation, and input key information "input" in case of a keyboard operation. Further, in case of the selection operation, positional information (coordinates) of a selected GUI may be included in the unprocessed input operation log as information related to the target of the input operation.

FIG. 6 is a diagram illustrating an example of a data structure of a processed input operation log according to the second example embodiment. The input operation log collection unit 101 extracts, from each of the unprocessed input operation logs, a type of an operation event (name=Event Type), the time of the occurrence of an operation event (time=Time), an application ID (window_name=Window Name), and information related to a target of an input operation (gui_path=GUI Path, Values). In this drawing (i.e., in this data structure), "Values" may be input key information or positional information (coordinates) of a selected GUI. Further, the input operation log collection unit 101 processes the extracted information into information having the data structure illustrated in this drawing. In this way, the input operation log collection unit 101 generates processed input operation logs 400 to 402.

FIG. 7 is a diagram illustrating an example of a data structure of an unprocessed web access log according to the second example embodiment. In the web access, processing and a process event may be referred to as access and an access event, respectively. The unprocessed web access log includes the time of the occurrence of an access event (time) and includes an accessed URL (url) as information related to the target of processing. Further, the unprocessed web access log may include a name of an access event (name).

Figure 8:
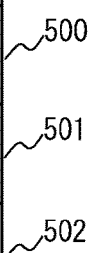
FIG. 8 is a diagram illustrating an example of a data structure of a processed web access log according to the second example embodiment.

FIG. 8 is a diagram illustrating an example of a data structure of a processed web access log according to the second example embodiment. The information log collection unit 102 extracts, from each of the processed web access logs, the time of the occurrence of an access event (time=Time) and information about a target of processing (url=URL). In this example, the information log collection unit 102 also extracts a name of an access event (name=Event Type). Then, the information log collection unit 102 processes the extracted information into information having the data structure illustrated in this drawing. In this way, the information log collection unit 102 generates processed information logs 500 to 502.

FIG. 9 is a diagram illustrating an example of a data structure of an unprocessed file access log according to the second example embodiment. In the file access, processing and a process event may also be referred to as access and an access event, respectively. In the unprocessed file access log, the time of the occurrence of an access event (time) is included, and path information (path) of accessed file data is included as information related to the target of processing. Note that when the accessed file data had been renamed in the past, path information of the file data before being renamed (old_path) is also included as the information related to the target of processing. Further, other information such as a name of an access event (name) and an operation type (action) may also be included in the unprocessed file access log.

FIG. 10 is a diagram illustrating an example of a data structure of a processed file access log according to the second example embodiment. The information log collection unit 102 extracts, from each of the unprocessed file access logs, the time of the occurrence of an access event (time=Time) and information about a target of processing (in this drawing, path information of accessed file data (path=Path)). In this example, the information log collection unit 102 also extracts path information of file data before being renamed (old_path=Old Path), a name of an access event (name=Event Type), and an operation type (action=Action). Then, the information log collection unit 102 processes the extracted information into information having the data structure illustrated in this drawing. In this way, the information log collection unit 102 generates processed information logs 600 and 601.

Figure 11:
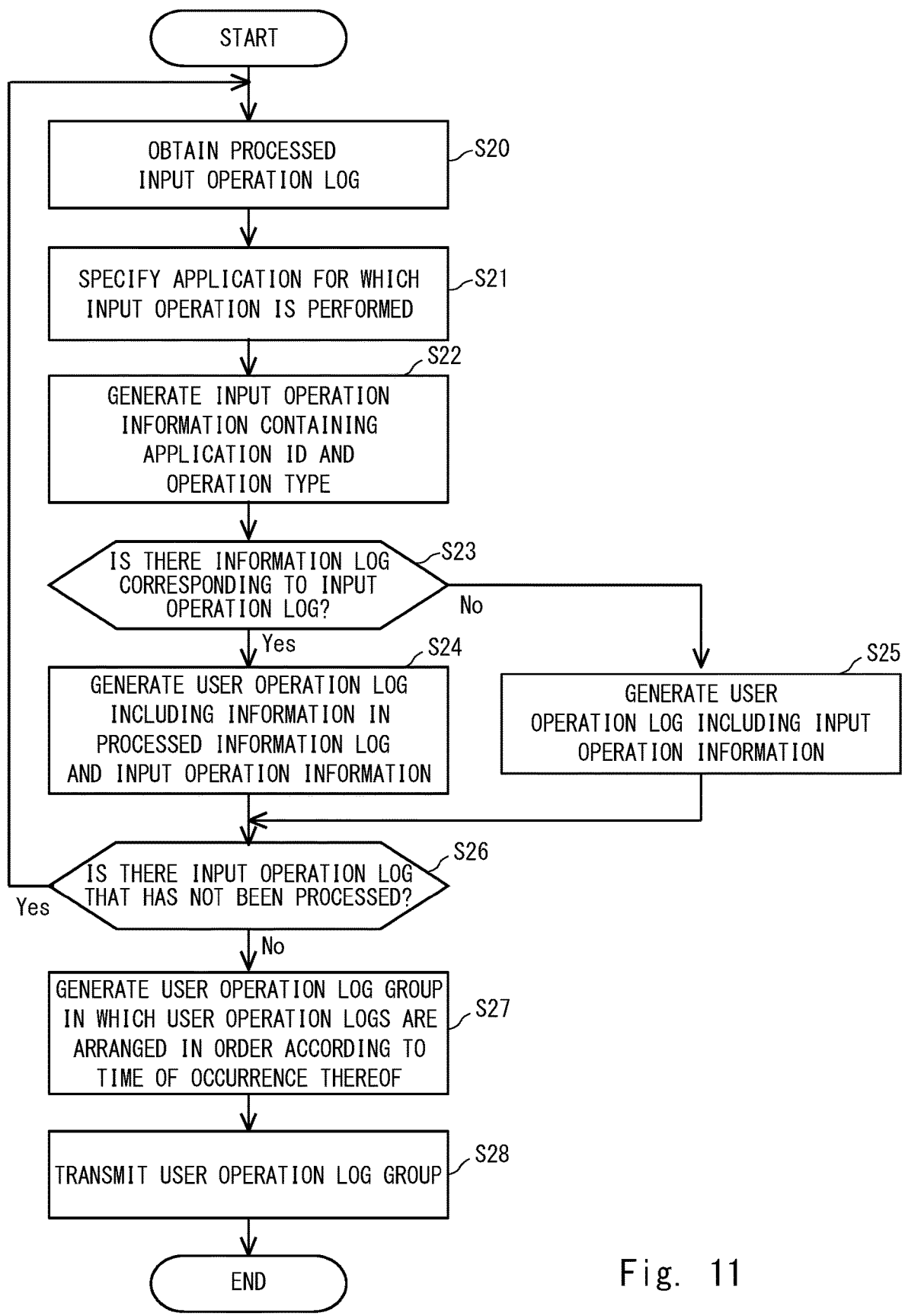
FIG. 11 is a flowchart illustrating an example of a flow of a log generation method according to the second example embodiment.

FIG. 11 is a flowchart illustrating an example of a flow of a log generation method according to the second example embodiment. First, the generation unit 104 of the information apparatus 100 acquires a processed input operation log(s) from the storage unit 103 (S20). Next, the generation unit 104 specifies an application for which an input operation is performed based on the acquired processed input operation log (S21). Specifically, the generation unit 104 specifies the application by extracting an application ID ("Window Name" in FIG. 6) from the processed input operation log. Note that the generation unit 104 may infer the application ID based on path information of an item to be selected ("GUI Path" in FIG. 6) or positional information of a selected GUI ("coordinates of Values" in FIG. 6) included in the processed input operation log. In this case, the information apparatus 100 may store in advance a table in which pieces of path information or positional information of GUIs are associated with application IDs. Note that in the following description, a "processed input operation log" is simply referred to as an "input operation log", and a "processed information log" is simply referred to as an "information log".

Next, the generation unit 104 generates input operation information including the specified application ID and the operation type included in the input operation log (S22). Note that information about the target of an input operation may also be included in the input operation information.

Next, the generation unit 104 determines whether or not there is, among the information logs stored in the storage unit 103, an information log corresponding to the input operation log (S23). Specifically, the generation unit 104 determines whether or not there is, among the information logs stored in the storage unit 103, an information log in which the time of the occurrence of a process event that coincides with the time of the occurrence of an operation event recorded in the input operation log is recorded. Then, the generation unit 104 extracts the information log in which the time of the occurrence coinciding with that recorded in the input operation log is recorded. In this process, the generation unit 104 may extract only an information log for which the degree of the correlation between the information about the name of an access event or the target of processing included in the information log and path information of an item to be selected or positional information of a selected GUI included in the input operation log is equal to or greater than a predetermined value.

When there is an information log corresponding to the input operation log (Yes at S23), the generation unit 104 generates a user operation log including the information contained in the information log and the input operation information (S24). Then, the generation unit 104 proceeds to a process in Step S26.

On the other hand, when there is no information log corresponding to the input operation log (No at S23), the generation unit 104 generates a user operation log including only the input operation information (S25). Then, the generation unit 104 proceeds to the process in Step S26.

In Step S26, the generation unit 104 determines whether or not there is, among the input operation logs stored in the storage unit 103, an input operation log that has not been processed yet. Then, as long as there is an input operation log that has not been processed yet, the generation unit 104 repeats the processes illustrated in Steps S20 to S26.

When there is no input operation log that has not been processed yet (No at S26), the generation unit 104 generates a user operation log group in which user operation logs are arranged (i.e., sorted) in an order according to the time of occurrences of operation events recorded therein (S27). Then, the transmission unit 105 transmits the generated user operation log group to the abnormality detection apparatus 200 through the network N (S28).

FIG. 12 is a diagram illustrating an example of a data structure of a user operation log group according to the second example embodiment. User operation logs 700 to 703 are included in the user operation log group illustrated in this drawing. Note that "Time", "Application ID", and "Operation Type" are information included in the input operation information.

For example, the time of the occurrence of an operation event recorded in an input operation log 400 does not coincide with any of the times of the occurrences of the process events recorded in the information logs 500 to 502, 600 and 601. Therefore, the generation unit 104 determines that there is no information log corresponding to the input operation log 400 (No at S23 in FIG. 11). Then, the generation unit 104 generates a user operation log 700 including the input operation information contained in the input operation log 400 (S25 in FIG. 11). Note that "null" may be added to, among the pieces of information contained in the user operation log 700, a piece(s) of information that is not included in the input operation information (e.g., "null" may be added to "Target" which is information about the target of processing).

Further, for example, the time of the occurrence of an operation event recoded in an input operation log 401 coincides with the time of the occurrence of a process event recorded in the information log 502. Therefore, the generation unit 104 determines that there is an information log corresponding to the input operation log 401 (Yes at S23 in FIG. 11). Then, the generation unit 104 generates a user operation log 701 that is obtained by unifying (or combining) the input operation information contained in the input operation log 401 with an URL (information about the target of processing) included in the information log 502 (S24 in FIG. 11).

As described above, according to the information apparatus 100 in accordance with the second example embodiment, an input operation log is complemented by an information log, and a user operation log including an application ID is generated. Further, a user operation log group is generated as a time-series sequence. Therefore, even when a user uses a plurality of applications, it is possible to generate a log group for detecting an abnormality in which an interaction (what kind of operation the user did for what object or the like, and when the user did it) between the user and an information apparatus is reflected (i.e., is taken into consideration) as a user's intention in doing a series of operations.

Figure 13:
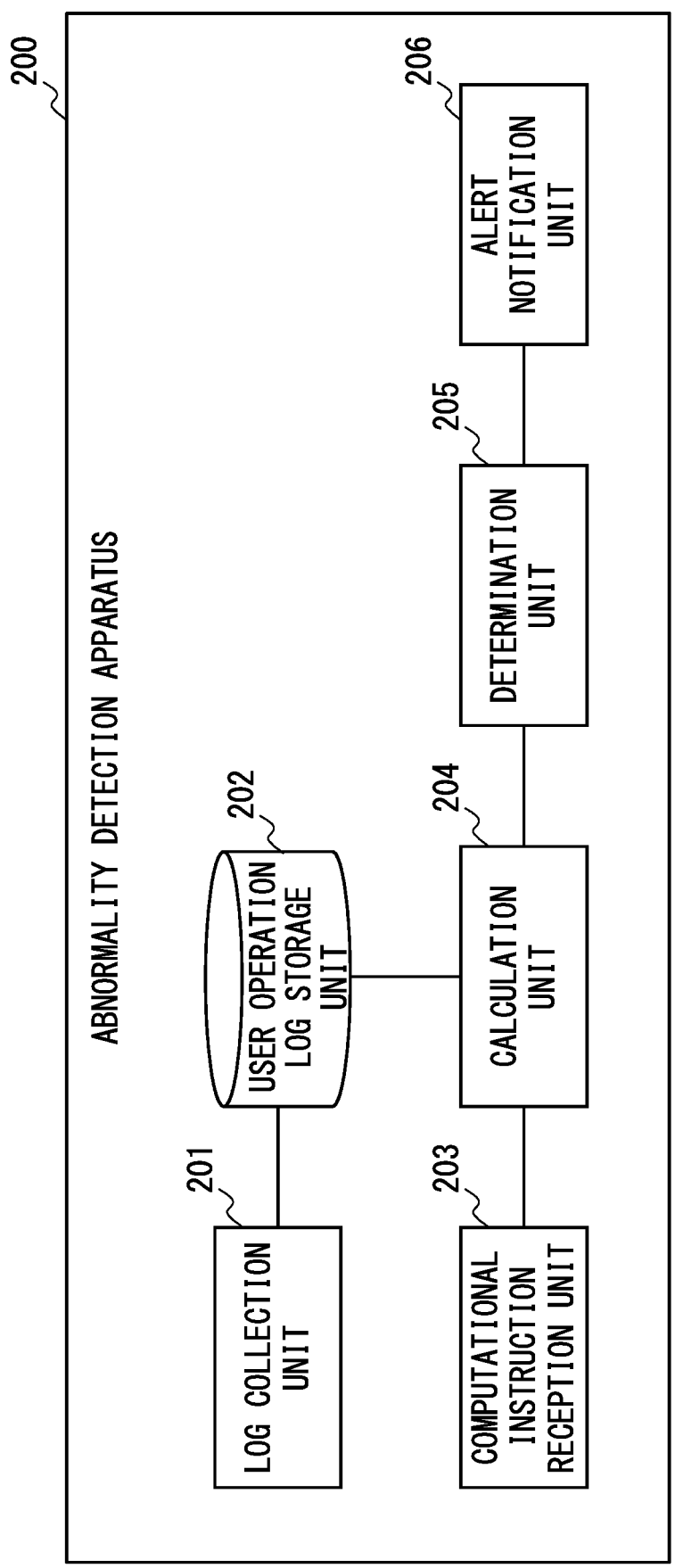
FIG. 13 is a block diagram illustrating a configuration of an abnormality detection apparatus according to the second example embodiment.

FIG. 13 is a block diagram illustrating a configuration of the abnormality detection apparatus 200 according to the second example embodiment. The abnormality detection apparatus 200 includes a log collection unit 201, a user operation log storage unit 202, a computational instruction reception unit 203, a calculation unit 204, a determination unit 205, and an alert notification unit 206.

The log collection unit 201 is also referred to as log collection means. The log collection unit 201 collects a plurality of user operation log groups from one information apparatus 100 or each of a plurality of information apparatuses 100. The log collection unit 201 stores the collected user operation log groups in the user operation log storage unit 202 in association with IDs of the information apparatuses 100.

The user operation log storage unit 202 is also referred to as user operation log storage means. The user operation log storage unit 202 is a storage medium that stores user operation log groups.

The computational instruction reception unit 203 is also referred to as computational instruction reception means. The computational instruction reception unit 203 receives a computational instruction from the management apparatus 300. In the second example embodiment, the computational instruction includes a plurality of computational parameter values used for processing by the calculation unit 204 (which will be described later).

Upon receiving the computational instruction, the computational instruction reception unit 203 supplies the received computational instruction to the calculation unit 204.

The calculation unit 204 is also referred to as calculation means. The calculation unit 204 extracts user operation log groups that are compared with each other (hereinafter, also expressed as user operation log groups to be compared) from the user operation log storage unit 202 by using some of the computational parameter values included in the computational instruction. Then, the calculation unit 204 calculates similarity between the user operation log groups to be compared by using some of the computational parameter values. In this process, the calculation unit 204 calculates similarity between the user operation log groups to be compared by using at least an application ID included in the user operation logs constituting the user operation log groups and the operation type included in the user operation logs.

The determination unit 205 is also referred to as determination means. The determination unit 205 determines whether or not an abnormality is detected based on the similarity between the user operation log groups to be compared, calculated by the calculation unit 204. For example, the determination unit 205 determines that an abnormality is detected when the similarity between the user operation log groups is smaller than a predetermined threshold value. The determination unit 205 supplies the result of the determination to the alert notification unit 206.

The alert notification unit 206 is also referred to as alert notification means. When an abnormality is detected, the alert notification unit 206 issues an abnormality alert. For example, the alert notification unit 206 notifies the management apparatus 300 of an abnormality alert.

FIG. 14 is a diagram illustrating an example of a data structure of a computational instruction according to the second example embodiment.

For example, the computational instruction includes an information apparatus ID related to the user operation log groups to be compared, a comparison period of the user operation log groups, a window period, and a threshold value.

The information apparatus ID and the comparison period are used for a process for extracting user operation log groups to be compared.

The window period and the threshold value are used for a process for calculating similarity between the user operation log groups to be compared.

Figure 15:
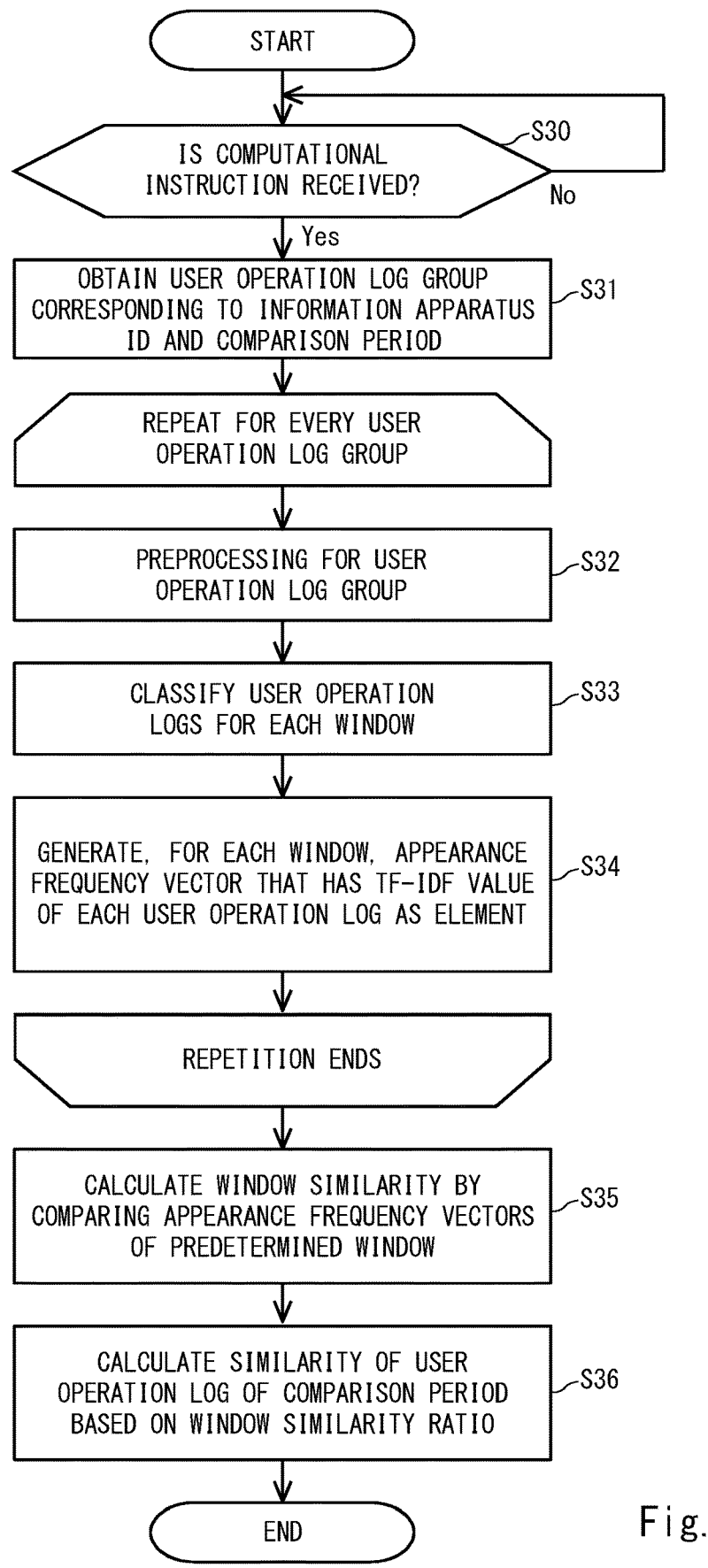
FIG. 15 is a flowchart illustrating an example of a flow of an abnormality detection method according to the second example embodiment.

FIG. 15 is a flowchart illustrating an example of a flow of an abnormality detection method according to the second example embodiment. First, when the computational instruction reception unit 203 of the abnormality detection apparatus 200 receives a computational instruction (Yes at S30), it supplies the received computational instruction to the calculation unit 204 and proceeds to a process in Step S31.

In Step S31, the calculation unit 204 acquires, by using an information apparatus ID and a comparison period included in the computational instruction, user operation log groups $S_a'$ and $S_b'$ corresponding to the information apparatus ID and the comparison period.

Then, the calculation unit 204 repeats processes illustrated in Steps S32 to S34 for each of the acquired user operation log groups $S_a'$ and $S_b'$.

In Step S32, the calculation unit 204 performs preprocessing for the user operation log groups. The user operation log groups $S_a'$ and $S_b'$ on which the preprocessing has been performed are represented by $S_a$ and $S_b$, respectively. Then, in Step S33, the calculation unit 204 classifies, by using the window period included in the computational instruction, the user operation logs included in the user operation log groups according to every window. For example, when the window period is one (Hour), the calculation unit 204 creates a window "0:00:00-0:59:59", a window "1:00:00-1:59:59", and . . . , and classifies each of the user operation logs into one of the windows based on the time of the occurrence of an event recorded therein (Time). Then, in Step S34, the calculation unit 204 generates, for each of the windows, an appearance frequency vector that includes, as its elements, TF-IDF (Term Frequency-Inverse Document Frequency) values of character strings of the user operation logs included in the window.

In the following description, appearance frequency vectors are expressed as follows.

[Expression 1]

$$v_{s,n} = \text{TFIDF\_Vec}_{s,n} \quad (1)$$

In the expression, $v_{s,n}$ is an appearance frequency vector of an nth window of the user operation log group S to be compared (S is $S_a$ or $S_b$). $\text{TFIDF\_Vec}_{s,n}$ is a vector including TF-IDF values of the user operation logs included in the nth window. This vector may be normalized so that the maximum value becomes 1.0 and the minimum value becomes 0 in order to make the calculation easier.

Figure 16:
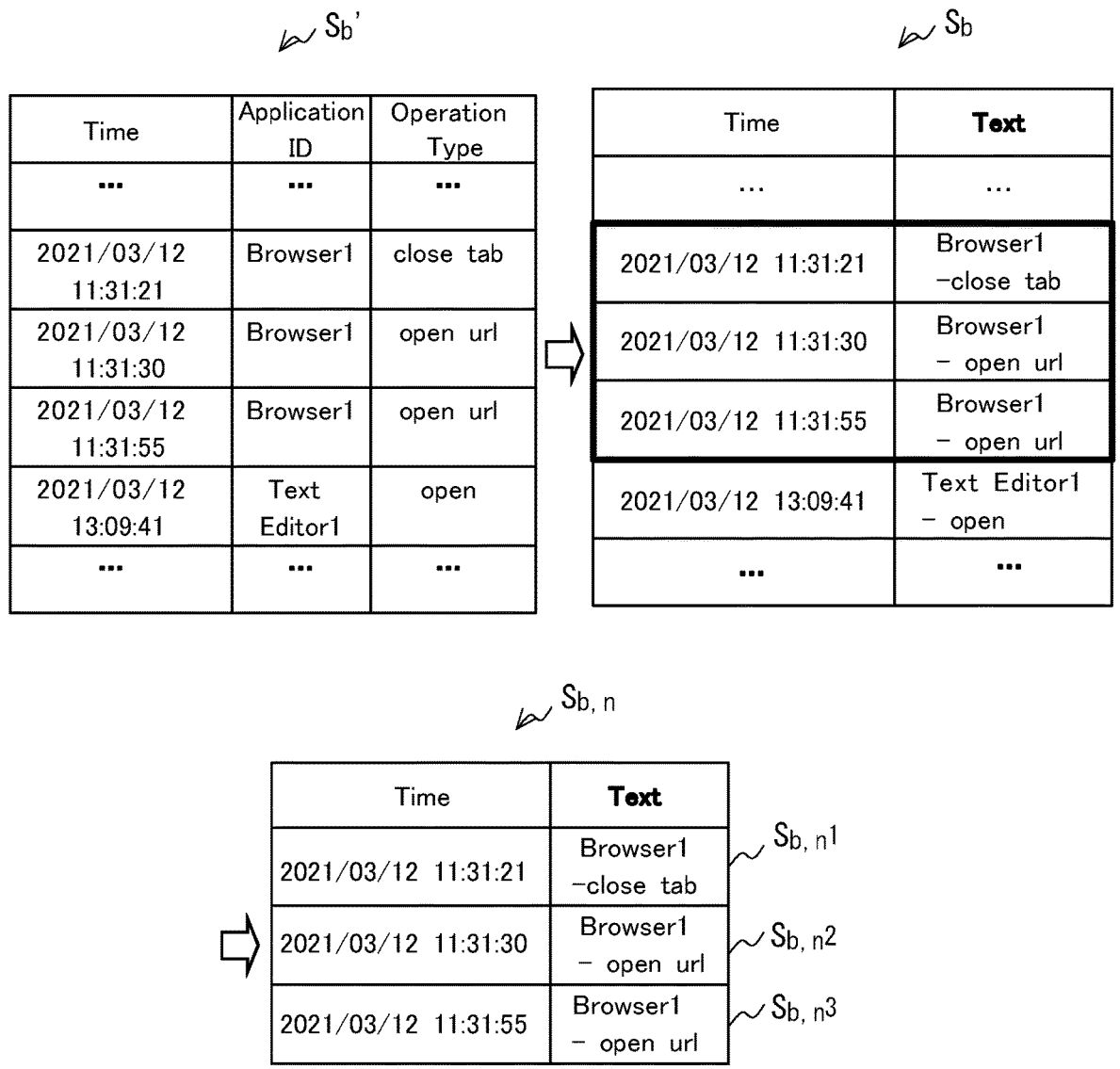
FIG. 16 is a diagram for explaining preprocessing of a user operation log group, a process for classifying it into windows, and a process for generating an appearance frequency vector according to the second example embodiment.

FIG. 16 is a diagram for explaining preprocessing for a user operation log group, a process for classifying them (i.e., classifying the user operation logs included therein) into windows, and a process for generating an appearance frequency vector according to the second example embodiment. This diagram shows preprocessing for a user operation log group $S_b'$ corresponding to a comparison period "B" of an information apparatus ID "0001", a process for classifying them (i.e., classifying the user operation logs included therein) into windows, and a process for generating an appearance frequency vector. For example, as the preprocessing, the calculation unit 204 combines a character string of an application ID (Application ID) of each of the user operation logs included in the user operation log group $S_b'$ with a character string of an operation type (Operation Type). In this way, the calculation unit 204 generates a user operation log group $S_b$ including user operation logs in each of which the time of the occurrence of an event (Time) is associated with a combined character string (Text).

Then, the calculation unit 204 classifies a plurality of user operation logs included in the user operation log group $S_b$ into groups corresponding to the respective windows. For example, the calculation unit 204 extracts, among the user operation logs included in the user operation log group $S_b$, user operation logs of which the times of the occurrences of events recorded therein (Time) are included in the window "11:00:00-11:59:59", and generates a user operation log group $S_{b,n}$ in which the extracted user operation logs are arranged (i.e., sorted) in the order of the time of occurrences of the events. $S_{b,n}$ represents a user operation log group corresponding to an nth window.

Then, the calculation unit 204 calculates, for each of user operation log groups $S_{b,n}^1$, $S_{b,n}^2$, and $S_{b,n}^3$ included in the user operation log group $S_{b,n}$, a TF-IDF value of a character string (Text) of the user operation log by using the character strings (Text) of all the user operation logs included in the user operation log group $S_b$ as a corpus. Then, the calculation unit 204 generates an appearance frequency vector including, its elements, the TF-IDF values of the character strings of all the user operation logs $S_{b,n}^1$, $S_{b,n}^2$, and $S_{b,n}^3$ included in the user operation log group $S_{b,n}$. In this process, the calculation unit 204 arranges (i.e., sorts) the TF-IDF values included in the appearance frequency vector in the order of the time of occurrences of operation events.

As described above, the calculation unit 204 calculates an appearance frequency vector of the user operation logs $S_{b,n}^1$, $S_{b,n}^2$, and $S_{b,n}^3$ included in the user operation log group $S_b$, from which the user operation logs of interest are extracted, by using an application ID and an operation type included in each of the user operation logs $S_{b,n}^1$, $S_{b,n}^2$, and $S_{b,n}^3$. Note that the calculation unit 204 calculates an appearance frequency vector for the user operation log group $S_a$ in the similar manner.

The description is continued by returning to FIG. 15 again. The calculation unit 204 compares an appearance frequency vector $v_{S_{a,n}}$ of the user operation log group $S_a$ calculated for a predetermined window (e.g., an nth window) with an appearance frequency vector $v_{S_{b,n}}$ of the user operation log group $S_b$ calculated for the predetermined window, and thereby calculates window similarity therebetween (S35). The window similarity is similarity between character strings of user operation logs of the user operation log groups $S_a$ and $S_b$ to be compared, included in the predetermined window. More specifically, the window similarity is similarity between appearance frequency vectors of the user operation log groups $S_a$ and $S_b$ to be compared, calculated for the predetermined window.

Figure 17:
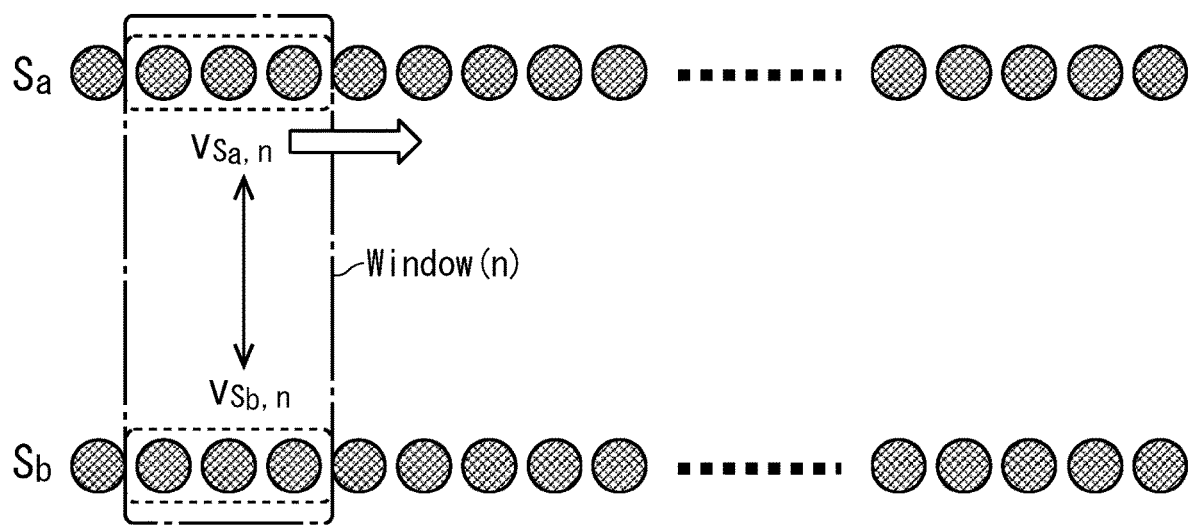
FIG. 17 is a diagram for explaining a process for generating window similarity according to the second example embodiment.

FIG. 17 is a diagram for explaining a process for generating window similarity according to the second example embodiment. Each of symbols "o" in this drawing represents a character string (Text) of a user operation log included in the user operation log groups $S_a$ and $S_b$. Dashed lines in this drawing indicate an nth window (Window (n)). The calculation unit 204 has already calculated appearance frequency vectors $v_{S_{a,n}}$ and $v_{S_{b,n}}$ of the nth window for the user operation log group $S_a$ and $S_b$, respectively. It can be considered that each of the appearance frequency vectors $v_{S_{a,n}}$ and $v_{S_{b,n}}$ represents an operation trend in the nth window. Then, the calculation unit 204 calculates window similarity by comparing these two appearance frequency vectors $v_{S_{a,n}}$ and $v_{S_{b,n}}$. For the window similarity, for example, cosine similarity may be adopted. The calculation unit 204, which has calculated the window similarity in the nth window, slides the window and proceeds to a process for calculating window similarity in a (n+1)th window. In this way, the calculation unit 204 calculates window similarity in each of all the windows.

The description is continued by returning to FIG. 15 again. The calculation unit 204 calculates similarity between the user operation log group $S_a$ and $S_b$ in the comparison period based on the window similarity in each of all the windows (S36).

For example, the similarity "Similarity" between the user operation log groups $S_a$ and $S_b$ can be expressed as follows.

[Expression 2]

$$\text{Similarity} = \frac{1}{N}\sum_{n=1}^{N}\cos(v_{S_a,n}, v_{S_b,n}) * \text{penalty}_{length} \quad (2)$$

In the expression, N represents the number of windows; $\cos(v_{S_{a,n}}, v_{S_{b,n}})$ represents window similarity of a second window; and $\text{penalty}_{length}$ represents a constraint condition related to lengths of the user operation log groups $S_a$ and $S_b$. For example, the $\text{penalty}_{length}$ is a constraint condition based on a difference between the lengths of the user operation log group $S_a$ and $S_b$. The lengths of the user operation log groups $S_a$ and $S_b$ indicate the numbers of user operation logs included in the user operation log groups $S_a$ and $S_b$, respectively.

Therefore, the penalty$_{length}$ can be expressed as follows.

[Expression 3]

$$\text{penalty}_{length} = \exp\left(\min\left(1 - \frac{\text{length}(s_a)}{\text{length}(s_b)}, 1 - \frac{\text{length}(s_b)}{\text{length}(s_a)}\right)\right) \quad (3)$$

In the expression, length(S) is a length of the user operation log group S, i.e., indicates the number of user operation logs included in the user operation log group S. For example, the number of user operations logs included in the user operation log group $S_b$ may be the number of rows of the user operation log group $S_b$ illustrated in FIG. 16.

As described above, the calculation unit 204 calculates the similarity "Similarity" between the user operation log groups $S_a$ and $S_b$ based on similarity between user operation logs of the user operation log group $S_a$, included in the window and those of the user operation log group $S_b$, included in the window (i.e., based on window similarity $\cos(v_{S_{a,n}}, v_{S_{b,n}})$) In this way, the calculation unit 204 can easily calculate the similarity "Similarity". Further, in the second example embodiment, the calculation unit 204 calculates the similarity "Similarity" by further using, as the constraint condition, the difference between the number of user operation logs included in the user operation log group $S_a$ and the number of user operation logs included in the user operation log $S_b$. By imposing such a constraint condition on the calculation of the similarity "Similarity", it is possible to make an adjustment so that the value of the similarity "Similarity" becomes smaller when the difference between the lengths of the user operation log groups $S_a$ and $S_b$ to be compared is large. In this way, it is possible to improve the accuracy of the calculation of the similarity "Similarity".

Note that the calculation unit 204 imposes a constraint condition related to the number of user operation logs included in the user operation log groups $S_a$ and $S_b$ when it calculates the similarity "Similarity" between the user operation log groups $S_a$ and $S_b$. Alternatively or additionally, the calculation unit 204 may calculate window similarity between user operation log groups for an nth window by further using, as an additional constraint condition, "information about the target of an input operation" in each of the user operation logs included in the nth window. In this way, it is possible to make an adjustment so that the similarity becomes smaller when the features of URLs or file paths of user operation logs included in the window are widely different from each other.

Further, in the flowchart illustrated in FIG. 15, the process for calculating an appearance frequency vector in each of all the windows included in the user operation log groups is completed (S34) before Step S35, in which window similarity is compared, is performed. However, the calculation unit 204 may instead perform the processes illustrated in Steps S34 and S35 as a series of processes for each window. In other words, the calculation unit 204 may perform the series of processes illustrated in Steps S34 and S35 while sliding the windows.

As described above, according to the abnormality detection apparatus 200 in accordance with the second example embodiment, a time-series sequence of user operation logs including an application ID is used as a user operation log group in which user's intention in doing a series of operations is reflected (i.e., taken into consideration) in order to detect an abnormality. Therefore, it is possible to improve the accuracy of the detection of an abnormality.

Third Example Embodiment

Next, a third example embodiment according to the present disclosure will be described. An abnormality detection system 1 according to the third example embodiment includes an information apparatus 100a and an abnormality detection apparatus 200a in place of the information apparatus 100 and the abnormality detection apparatus 200, respectively. The information apparatus 100a transmits input operation logs (i.e., processed input operation logs) and information logs (i.e., processed information logs) to the abnormality detection apparatus 200a. The abnormality detection apparatus 200a generates a user operation log group based on the received input operation logs and information logs, and accumulates the user operation log group. That is, in the third example embodiment, the abnormality detection apparatus 200a corresponds to the log generation apparatus 10. Note that the process for detecting an abnormality performed by the abnormality detection apparatus 200a is similar to that performed by the abnormality detection apparatus 200.

Figure 18:
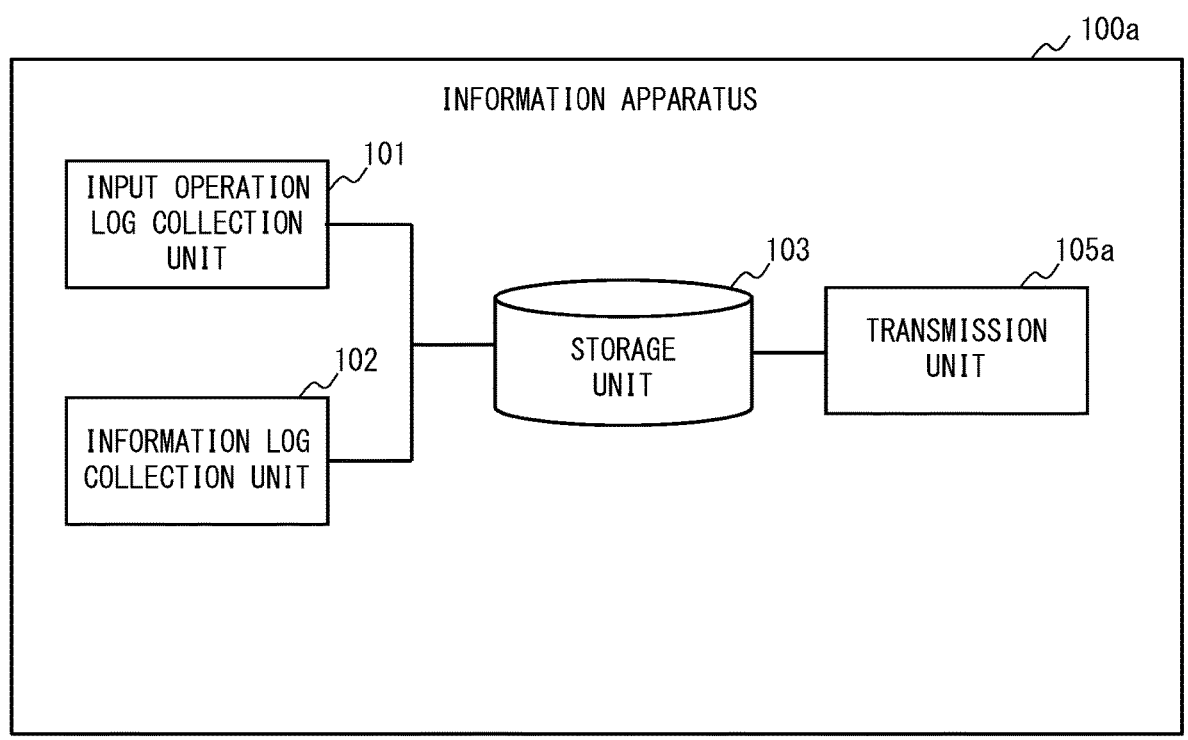
FIG. 18 is a block diagram illustrating a configuration of an information apparatus according to a third example embodiment.

FIG. 18 is a block diagram illustrating a configuration of the information apparatus 100a according to the third example embodiment. The information apparatus 100a differs from the information apparatus 100 in that the generation unit 104 is eliminated and a transmission unit 105a is provided in place of the transmission unit 105. The transmission unit 105a transmits input operation logs and information logs stored in the storage unit 103 to the abnormality detection apparatus 200a.

Figure 19:
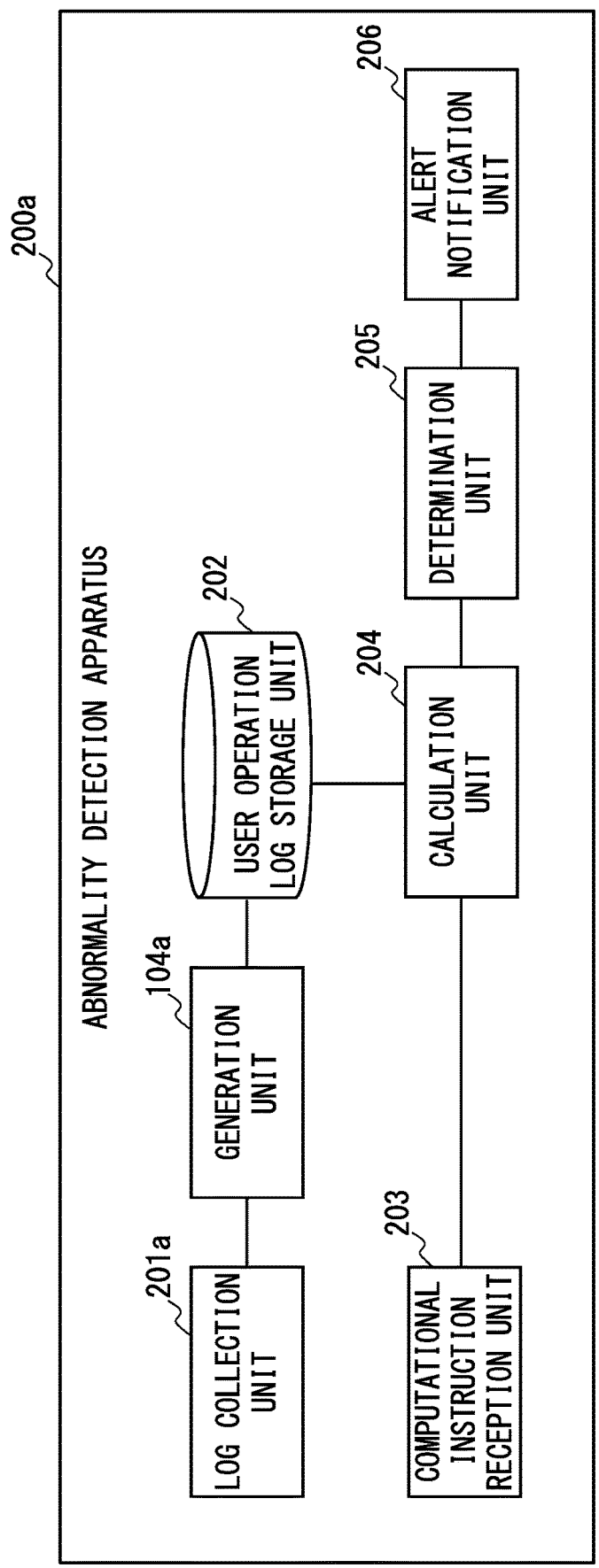
FIG. 19 is a block diagram illustrating a configuration of an abnormality detection apparatus according to the third example embodiment.

FIG. 19 is a block diagram illustrating a configuration of the abnormality detection apparatus 200a according to the third example embodiment. The abnormality detection apparatus 200a differs from the abnormality detection apparatus 200 in that the abnormality detection apparatus 200a includes a log collection unit 201a in place of the log collection unit 201 and includes a generation unit 104a.

The log collection unit 201a collects input operation logs and information logs from one information apparatus 100a or each of a plurality of information apparatuses 100a. The log collection unit 201a supplies the collected input operation logs and information logs to the generation unit 104a.

Similarly to the generation unit 104 of the information apparatus 100 according to the second example embodiment, the generation unit 104a generates a user operation log group based on the input operation logs and the information logs. Then, the generation unit 104a stores the generated user operation log group in the user operation log storage unit 202.

Note that the present invention is not limited to the above-described example embodiments, and they can be modified as appropriate without departing from the scope and spirit of the invention. For example, in the above-described example embodiments, the abnormality detection apparatus 200 uses an appearance frequency vector including, as its elements, TF-IDF values of character strings of user operation logs when it calculates window similarity. However, the abnormality detection apparatus 200 may instead use any of other types of vectors as long as it is a vector including, as its elements, numerical values representing features of character strings of user operation logs.

Note that the above-described example embodiments have been described as hardware configurations, but the present disclosure is not limited to the hardware configurations. The present disclosure may also be implemented by causing a CPU to execute a computer program.

In the above-described examples, the program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

The whole or part of the example embodiments disclosed above can be described as, but not limited to, the following supplementary notes.

(Supplementary Note 1)

A log generation apparatus comprising:
input operation log collection means for collecting input operation logs in each of which an operation event of an input device is recorded;
information log collection means for collecting information logs in each of which a process event related to processing performed by an information apparatus connected to the input device is recorded, the information logs being different from the input operation logs; and
generation means for generating, based on the information logs and the input operation logs, a user operation log including identification information of an application, the application being one which is inferred from the input operation logs and for which the processing is performed, and generating, as a log group for detecting an abnormality, a user operation log group including the user operation logs arranged in an order according to times of occurrences of operation events or process events.

(Supplementary Note 2)

The log generation apparatus according to Supplementary note 1, wherein the information logs to be collected include information logs of which applications for which the processing is performed are different from each other.

(Supplementary Note 3)

The log generation apparatus according to Supplementary note 1 or 2, wherein the user operation logs include input operation information including identification information of the application and at least one of a time of an occurrence of the operation event, information indicating a type of an input operation, or information about a target of the input operation.

(Supplementary Note 4)

The log generation apparatus according to Supplementary note 3, wherein the generation means is configured to:
specify, for each of the input operation logs, an application for which an input operation is performed; and
generate, when there is an information log including a time of an occurrence of a process event corresponding to the time of the occurrence of the operation event, the user operation log based on the information log and the input operation information.

(Supplementary Note 5)

The log generation apparatus according to Supplementary note 3 or 4, wherein when there is no information log including a time of an occurrence of a process event corresponding to the time of the occurrence of the operation event, the generation means is configured to generate the user operation log based on the input operation information.

(Supplementary Note 6)

An abnormality detection system comprising:
a log generation apparatus according to any one of Supplementary notes 1 to 5; and
an abnormality detection apparatus configured to detect an abnormality by using the user operation log group.

(Supplementary Note 7)

The abnormality detection system according to Supplementary note 6, wherein the abnormality detection apparatus comprises:
log collection means for collecting a plurality of user operation log groups;
calculation means for calculating similarity between user operation log groups by using at least identification information of an application included in user operation logs constituting a respective user operation log group and a type of an input operation included in the user operation logs; and
determination means for determining whether an abnormality is detected or not based on the similarity between the user operation log groups.

(Supplementary Note 8)

The abnormality detection system according to Supplementary note 7, wherein the calculation means is configured to:
extract, for each of the user operation log groups, a user operation log included in a window indicating a predetermined period from the user operation log group; and
calculate similarity between each pair of the user operation log groups based on window similarity between the user operation logs of the pair of the user operation log groups included in the window extracted for each of the user operation log groups.

(Supplementary Note 9)

The abnormality detection system according to Supplementary note 8, wherein the calculation means is configured to:
calculate a vector indicating a frequency of appearances of the user operation logs extracted for each of the user operation log groups in the user operation log group by using identification information of an application included in each of the extracted user operation logs and a type of an input operation included in each of the extracted user operation logs; and
calculate the window similarity by using the vector calculated for the window of one of the pair of the user operation log groups and the vector calculated for the window of the other of the pair of the user operation log groups.

(Supplementary Note 10)

The abnormality detection system according to Supplementary note 9, wherein the calculation means is configured to calculate the window similarity between the pair of the user operation log groups by further using information about a target of the input operation included in each of the user operation logs included in the window.

(Supplementary Note 11)

The abnormality detection system according to any one of Supplementary notes 7 to 10, wherein the calculation means is configured to calculate similarity between each pair of user operation log groups by further using a difference between the numbers of user operation logs included in the respective user operation log groups.

(Supplementary Note 12)

The abnormality detection system according to any one of Supplementary notes 7 to 11, further comprising alert notification means for issuing an abnormality alert when an abnormality is detected.

(Supplementary Note 13)

A log generation method comprising:
collecting input operation logs in which an operation event of an input device is recorded;
collecting information logs in which a process event related to processing performed by an information apparatus connected to the input device is recorded, the information logs being different from the input operation logs;
generating, based on the information logs and the input operation logs, a user operation log including identification information of an application, the application being one which is inferred from the input operation logs and for which the processing is performed; and
generating, as a log group for detecting an abnormality, a user operation log group including the user operation logs arranged in an order according to times of occurrences of operation events or process events.

(Supplementary Note 14)

A non-transitory computer readable medium storing a program for causing a computer to perform:
an input operation log collection process for collecting input operation logs in which an operation event of an input device is recorded;
an information log collection process for collecting information logs in which a process event related to processing performed by an information apparatus connected to the input device is recorded, the information logs being different from the input operation logs; and
a generation process for generating, based on the information logs and the input operation logs, a user operation log including identification information of an application, the application being one which is inferred from the input operation logs and for which the processing is performed, and generating, as a log group for detecting an abnormality, a user operation log group including the user operation logs arranged in an order according to times of occurrences of operation events or process events.

REFERENCE SIGNS LIST

1 ABNORMALITY DETECTION SYSTEM
10 LOG GENERATION APPARATUS
11 INPUT OPERATION LOG COLLECTION UNIT
12 INFORMATION LOG COLLECTION UNIT
14 GENERATION UNIT
100, 100a INFORMATION APPARATUS
101 INPUT OPERATION LOG COLLECTION UNIT
102 INFORMATION LOG COLLECTION UNIT
103 STORAGE UNIT
104, 104a GENERATION UNIT
105, 105a TRANSMISSION UNIT
150 INPUT DEVICE
200, 200a ABNORMALITY DETECTION APPARATUS
201 LOG COLLECTION UNIT
201a LOG COLLECTION UNIT
202 USER OPERATION LOG STORAGE UNIT
203 COMPUTATIONAL INSTRUCTION RECEPTION UNIT
204 CALCULATION UNIT
205 DETERMINATION UNIT
206 ALERT NOTIFICATION UNIT
300 MANAGEMENT APPARATUS
N NETWORK

What is claimed is:

1. An abnormality detection system comprising:
a log generation apparatus; and
an abnormality detection apparatus configured to detect an abnormality by using a user operation log group,
wherein the log generation apparatus comprises:
at least one first memory storing first instructions; and
at least one first processor configured to execute the first instructions to:
collect input operation logs in which an operation event of an input device is recorded;
collect information logs in which a process event related to processing performed by an information apparatus connected to the input device is recorded, the information logs being different from the input operation logs;
generate, based on the information logs and the input operation logs, a user operation log including identification information of an application, the application being one which is inferred from the input operation logs and for which the processing is performed; and
generate, as a log group for detecting an abnormality, the user operation log group including the user operation logs arranged in an order according to times of occurrences of operation events or process events,
and wherein the abnormality detection apparatus comprises:
at least one second memory storing second instructions; and
at least one second processor configured to execute the second instructions to:
collect a plurality of user operation log groups;
extract, for each of the user operation log groups, a user operation log included in a window indicating a predetermined period from the user operation log group;
calculate similarity between the user operation log groups by using at least identification information of an application included in user operation logs constituting a respective user operation log group and a type of an input operation included in the user operation logs, including
calculating similarity between each pair of the user operation log groups based on window similarity between the user operation logs of the pair of the user operation log groups included in the window extracted for each of the user operation log groups; and
determine whether an abnormality is detected or not based on the similarity between the user operation log groups.

2. The abnormality detection system according to claim 1, wherein the at least one second processor is further configured to execute the second instructions to:
calculate a vector indicating a frequency of appearances of user operation logs extracted for each of the user operation log groups in the user operation log group by using identification information of an application included in each of the extracted user operation logs and a type of an input operation included in each of the extracted user operation logs; and calculate the window similarity by using the vector calculated for the window of one of the pair of the user operation log groups and the vector calculated for the window of the other of the pair of the user operation log groups.

3. The abnormality detection system according to claim 2, wherein the at least one second processor is further configured to execute the second instructions to calculate the window similarity between the pair of the user operation log groups by further using information about a target of the input operation included in each of the user operation logs included in the window.

4. The abnormality detection system according to claim 1, wherein the at least one second processor is further configured to execute the second instructions to calculate similarity between each pair of user operation log groups by further using a difference between the numbers of user operation logs included in the respective user operation log groups.

5. The abnormality detection system according to claim 1, wherein the at least one second processor is further configured to execute the second instructions to issue an abnormality alert when an abnormality is detected.

6. The abnormality detection system according to claim 1, wherein the information logs to be collected include information logs of which applications for which the processing is performed are different from each other.

7. The abnormality detection system according to claim 1, wherein the user operation logs include input operation information further including, in addition to identification information of the application, at least one of a time of an occurrence of the operation event, information indicating a type of an input operation, and information about a target of the input operation.

8. The abnormality detection system according to claim 7, wherein the at least one first processor is further configured to execute the first instructions to:
specify, for each of the input operation logs, an application for which an input operation is performed; and
generate, when there is an information log including a time of an occurrence of a process event corresponding to the time of the occurrence of the operation event, the user operation log based on the information log and the input operation information.

9. The abnormality detection system according to claim 7, wherein when there is no information log including a time of an occurrence of a process event corresponding to the time of the occurrence of the operation event, the at least one first processor is further configured to execute the first instructions to generate the user operation log based on the input operation information.

10. A method performed an abnormality detection system including a log generation apparatus and an abnormality detection apparatus configured to detect an abnormality by using a user operation log group, wherein the method comprises:
performing, by the log generation apparatus:
collecting input operation logs in which an operation event of an input device is recorded;
collecting information logs in which a process event related to processing performed by an information apparatus connected to the input device is recorded, the information logs being different from the input operation logs;
generating, based on the information logs and the input operation logs, a user operation log including identification information of an application, the application being one which is inferred from the input operation logs and for which the processing is performed; and
generating, as a log group for detecting an abnormality, the user operation log group including the user operation logs arranged in an order according to times of occurrences of operation events or process events; and performing, by the abnormality detection apparatus:
collecting a plurality of user operation log groups;
extracting, for each of the user operation log groups, a user operation log included in a window indicating a predetermined period from the user operation log group;
calculating similarity between the user operation log groups by using at least identification information of an application included in user operation logs constituting a respective user operation log group and a type of an input operation included in the user operation logs, including
calculating similarity between each pair of the user operation log groups based on window similarity between the user operation logs of the pair of the user operation log groups included in the window extracted for each of the user operation log groups; and
determining whether an abnormality is detected or not based on the similarity between the user operation log groups.

11. A non-transitory computer-readable data storage medium storing program code executable by an abnormality detection system to perform processing, the abnormality detection system including a log generation apparatus and an abnormality detection apparatus configured to detect an abnormality by using a user operation log group, wherein the processing comprises:
performing, by the log generation apparatus:
collecting input operation logs in which an operation event of an input device is recorded;
collecting information logs in which a process event related to processing performed by an information apparatus connected to the input device is recorded, the information logs being different from the input operation logs;
generating, based on the information logs and the input operation logs, a user operation log including identification information of an application, the application being one which is inferred from the input operation logs and for which the processing is performed; and
generating, as a log group for detecting an abnormality, the user operation log group including the user operation logs arranged in an order according to times of occurrences of operation events or process events; and performing, by the abnormality detection apparatus:
collecting a plurality of user operation log groups;
extracting, for each of the user operation log groups, a user operation log included in a window indicating a predetermined period from the user operation log group;
calculating similarity between the user operation log groups by using at least identification information of an application included in user operation logs constituting a respective user operation log group and a type of an input operation included in the user operation logs, including calculating similarity between each pair of the user operation log groups based on window similarity between the user operation logs of the pair of the user operation log groups included in the window extracted for each of the user operation log groups; and determining whether an abnormality is detected or not based on the similarity between the user operation log groups.

* * * * *